May 24, 1966  H. B. VON THUENGEN  3,252,284
VARIABLE SPEED HYDROSTATIC TRANSMISSION
Filed April 22, 1964  2 Sheets-Sheet 1

Inventor:
HUBERT BARON VON THUENGEN
by Albert M. Zalkind

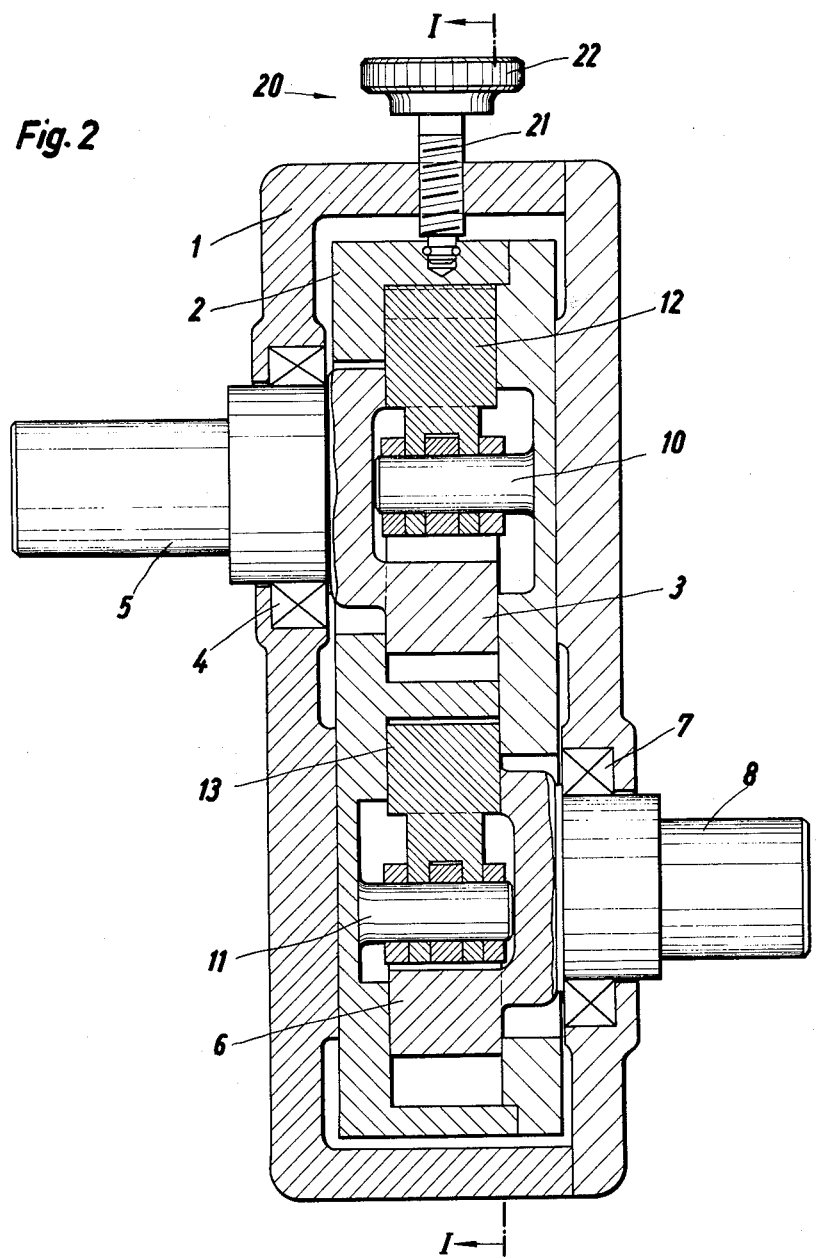

United States Patent Office 3,252,284
Patented May 24, 1966

3,252,284
VARIABLE SPEED HYDROSTATIC TRANSMISSION
Hubert Baron von Thuengen, Friedrichshafen, Germany, assignor to Zahnradfabrik Friedrichshafen Aktiengesellschaft, Friedrichshafen, Germany
Filed Apr. 22, 1964, Ser. No. 361,856
Claims priority, application Germany, Apr. 30, 1963, Z 10,090
1 Claim. (Cl. 60—53)

This invention relates to a variable speed transmission of the hydrostatic type involving a fluid pump and motor arrangement employing fluid displacing vane assemblies.

In transmissions of the foregoing type, the speed ratio between the input and output members have been varied by adjusting the eccentricity of the rotor axes of the pump and motor units relative to the vane assemblies or fluid pressure chambers with which they are associated. The fluid displacement rate and pressure spaces are thereby varied in order to change the speed ratio. In addition to the constructional problems involved in accommodating eccentric adjustment, prior transmissions of the aforementioned type were characterized by vane assemblies establishing line contact with the internal surface of the pressure chamber at one instantaneous location for displacing fluid where vanes of fixed radial length were employed.

It is therefore a primary object of the present invention to provide a variable speed, hydrostatic transmission in which radially fixed fluid displacing vanes are rotatably mounted in fixed relation within pressure chambers, said vanes being rotatable with drive and driven rotors through which the pressure spaces in the chambers are varied by adjustment of the rotor axes relative to the chambers while the relationship of the vanes within the chambers remains unchanged.

An additional object is to provide a hydrostatic transmission, the speed ratio of which may be varied by adjustment of the rotor axes relative to associated pressure chambers without any radial or angular displacement of the fluid displacing vanes which are rotatable with the rotors within the chambers.

In accordance with the foregoing objects, the hydrostatic transmission of the present invention is characterized by more efficient adjustment facilities capable of being operated either manually or by servo-motor means. Also, hydraulic efficiency at all speed ratio settings may be maintained.

These together with other objects and advantages which will become apparent reside in the details of construction and operation as more fully hereinafter described and claimed, reference being had to the accompanying drawings forming a part hereof, and in which:

FIGURE 2 is a sectional view taken substantially through a plane indicated by section line II—II in FIGURE 1.

Figure 1:
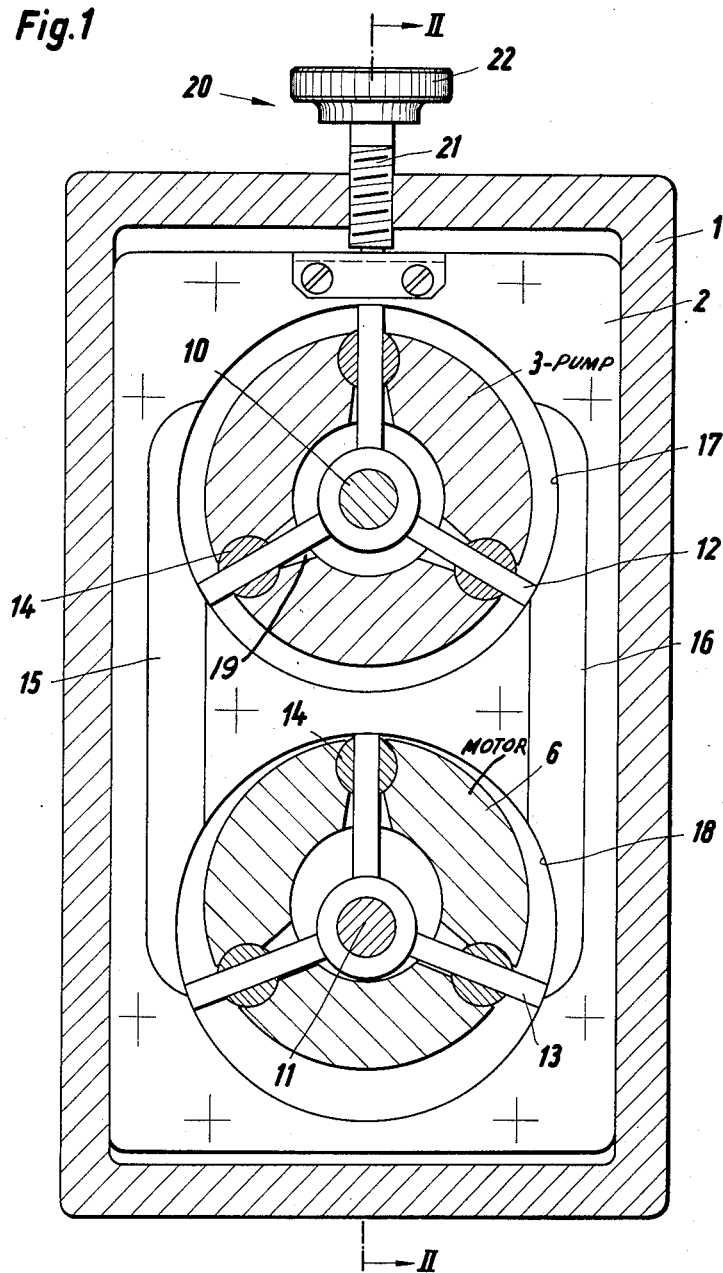
FIGURE 1 is a sectional view of the transmisison.

Referring now to the drawings in detail, reference numeral 1 generally denotes an outer, relatively stationary housing. In one specific embodiment, an input shaft 5 extends into the housing 1 on one side thereof while an output shaft 8 projects from the other side. The input and output shafts are rotatably mounted infixed parallel spaced relation to each other relative to the housing 1 by bearing assemblies 4 and 7. The speed or drive ratio between the input and output shafts is varied manually by adjustment means 20, although it will be obvious that other adjustment means may be used as a servo-motor.

The adjustment means shown includes a self-locking worm gear or screw 21 threadedly mounted by the outer housing for axial movement. The outer end of the worm gear or screw is provided with a knob 22 while the inner end is connected to an inner housing 2 for shifting the adjusted position thereof within the outer housing 1 and holding it in its adjusted position. The inner housing is therefore slidably mounted within the outer housing. Enclosed within the inner housing in fixed spaced relation to each other are a pair of cylindrical pressure chambers consisting of a pump chamber defined by annular wall surface 17 and a motor chamber defined by surface 18. Also disposed in fixed concentric relation within the chambers and connected to opposite sides of the inner housing are bearing shafts 10 and 11. Thus, each bearing shaft rotatably mounts a fluid displacing vane assembly in concentric relation within the pressure chamber.

Each of the vane assemblies includes a plurality of radially fixed vanes 12 or 13 disposed in angularly fixed relation to each other for constant surface contact with the internal wall surfaces 17 and 18 of the chambers in order to form fluid operating spaces between the vanes. The volume of the operating spaces are also defined by the radially outer surfaces of the rotors 3 and 6 respectively connected to the input and output shafts 5 and 8. It will therefore be apparent that the volume of the operating spaces between the vanes will cyclically vary in response to rotation of the rotors. The magnitude of the volumetric variation in the operating spaces will depend upon the amount of misalignment between the rotor axes extending through the input and output shafts and the adjustably positioned axes extending through the vane mounting shafts 10 and 11. A pair of fluid flow passages 15 and 16 are formed in the inner housing tangentially interconnecting the pump and motor chambers to establish a closed fluid circuit therebetween. Rotation of rotor 3 in a counter-clockwise direction for example, as viewed in FIGURE 1 will therefore cause the vanes 12 to displace fluid such as oil into the operating spaces between vanes 13 through passage 15, fluid returning through passage 16. The relative volumes of the operating spaces in the pump and motor chambers will therefore determine the speed ratio which may be varied by the repositioning of the chambers relative to the rotors.

In order to accommodate the aforementioned adjustable positioning of the chambers without any angular or radial disturbance of the vanes within the chambers, the rotors are provided with slide pivot inserts 14 through which the vanes slidably extend. Also, radially extending passages 19 are formed in the rotors which diverge in a radially inward direction from the pivot inserts so as to accommodate the limited angular movement of the vanes relative to the rotors when speed ratio adjustments are being made.

From the foregoing description, the constructional and operational advantages of the hydrostatic transmission of the present invention will be apparent. It will therefore be appreciated that a constructional arrangement wherein constant surface contact between the radial ends of the vanes 12 and 13 and the wall surfaces of the pressure chambers is realized which will reduce leakage and fluid losses inherent therein. Also, an infinite speed ratio variation is attainable with substantially good efficiency at all ratios because of the relationship of the operating spaces in the pump and motor chambers exposed tangentially to the flow passages 15 and 16. Thus, at the zero position of the pump rotor 3, the motor chamber will have its maximum fluid receiving volume while at the position of maximum displacement volume of the pump rotor, the rotor 6 will define the minimum receiving volume in the motor chamber. The constructional simplicity and adjustment facility of the transmission will also be apparent from the described structure.

The foregoing is considered as illustrative only of the principles of the invention. Further, since numerous modifications and changes will occur to those skilled in the art, all suitable modifications and equivalents may be resorted to falling within the scope of the invention as claimed.

What is claimed as new is as follows:

A variable speed transmission of the hydrostatic type involving a fluid pump and motor arrangement employing fluid dispacing vane assemblies, having an input shaft and an output shaft rotatably mounted in fixed parallel spaced relation to each other comprising (a) an outer housing 1 and an inner housing 2, slidably mounted within said outer housing;
(b) a pair of cylindrical pressure chambers 17, 18 enclosed within the inner housing in fixed spaced relation to each other;
(c) bearing shafts 10, 11 disposed in fixed concentric relation within said pressure chambers and connected to opposite sides of said inner housing;
(d) rotatably disposed on each of said bearing shafts a vane assembly including a plurality of radially fixed vanes 12, 13 arranged in angularly fixed relation to each other for constant surface contact with the internal wall surfaces of said chambers in order to form fluid operating spaces between the vanes;
(e) a rotor 3 connected to said input shaft defining the volume of the operating space of said pump by its radially outer surface, and
(f) a rotor 6 connected to said output shaft defining the volume of the operating space of said motor by its radially outer surface;
(g) bearing assemblies 4, 7 for said input and output shafts disposed in said outer housing in fixed parallel spaced relation to each other;
(h) a pair of fluid flow passages 15, 16 formed in said inner housing tangentially interconnecting the pump and motor chambers;
(i) means for adjustably positioning said inner housing within said outer housing.

References Cited by the Examiner

UNITED STATES PATENTS 2,390,240 12/1945 De Lancey _____ 60—53
3,072,068 1/1963 Weiss _____ 103—144

FOREIGN PATENTS 234,680 5/1925 Great Britain.

EDGAR W. GEOGHEGAN, *Primary Examiner.*

SAMUEL LEVINE, *Assistant Examiner.*